United States Patent [19]

Su

[11] Patent Number: 4,461,872

[45] Date of Patent: Jul. 24, 1984

[54] BLENDS OF A PROPYLENE/α-OLEFIN COPOLYMER WITH ISOTACTIC PROLYPROPYLENE

[75] Inventor: Aaron C. L. Su, Wilmington, Del.

[73] Assignee: E. I. Du Pont de Nemours and Company, Wilmington, Del.

[21] Appl. No.: 468,409

[22] Filed: Feb. 22, 1983

[51] Int. Cl.³ .................... C08L 23/10; C08L 23/18
[52] U.S. Cl. ................... 525/240; 526/348.3; 526/348.5
[58] Field of Search ........................... 525/240

[56] References Cited

U.S. PATENT DOCUMENTS

| | | | |
|---|---|---|---|
| 3,882,197 | 5/1975 | Fritz et al. | 260/897 A |
| 3,888,949 | 6/1975 | Chi-Kai Shih | 260/897 A |
| 4,169,116 | 9/1979 | Trotter et al. | 525/210 |
| 4,259,470 | 3/1981 | Trotter et al. | 526/348.2 |

FOREIGN PATENT DOCUMENTS 2757863 6/1978 Fed. Rep. of Germany .

OTHER PUBLICATIONS

Fritz and Su Abandoned, U. J. Application Ser. No. 369,273, filed 6-11-73.

*Primary Examiner*—Carman J. Seccuro
*Attorney, Agent, or Firm*—Paul R. Steyermark

[57] ABSTRACT

Blends of an isotactic propylene polymer with a copolymer of propylene with a $C_6$-$C_{12}$ α-olefin, wherein the mole proportion of the α-olefin in the copolymer is 10-55%; the crystallinity number of the copolymer is 10 to 37; and the sum of the mole proportion of α-olefin in the copolymer and the copolymer's crystallinity number is 20-65 are useful in a variety of applications requiring a broad range of properties from soft elastomers to rigid plastics, including spunbonded fiber materials, film, and adhesives.

8 Claims, 2 Drawing Figures

BLENDS OF A PROPYLENE/α-OLEFIN COPOLYMER WITH ISOTACTIC PROLYPROPYLENE

BACKGROUND OF THE INVENTION

This invention relates to blends of propylene/α-olefin copolymers with isotactic polypropylene which cover a wide range of products having properties ranging from those of elastomers to rigid plastics. In these blends, isotactic polypropylene is cocrystallizable with the propylene/α-olefin copolymers.

U.S. Pat. No. 3,888,949 to Chi-Kai Shih describes blends of stereoregular propylene/α-olefin copolymers with polypropylene of similar stereoregularity, which have improved injection molding characteristics. The patentee speculates that the desirable properties of his blends are due to the cocrystallization phenomenon. The propylene/α-olefin copolymer has a high crystallinity number, within the range of 40–70.

U.S. Pat. No. 3,882,197 to Fritz et al. describes blends of stereoregular propylene/α-olefin copolymers, stereoregular polypropylene, and ethylene copolymer rubbers. These blends all have improved injection molding characteristics but are softer than the blends of U.S. Pat. No. 3,888,949, which inherently are hard materials. It is believed that the propylene/α-olefin copolymers used in both U.S. patents and earlier disclosed in abandoned application of Fritz et al. Ser. No. 281,942 were fairly heterogenous, that is, contained a rather broad mixture of copolymers of different propylene/α-olefin ratios. Because of this, a rather high crystallinity number was required to impart to the blends sufficient strength. These elastoplastic compositions had a rather high hardness (Shore A higher than 90) and thus were not suitable for applications where soft, elastomeric properties were required, for example, molded rubber shoe soles.

It would be very desirable to be able to produce blends of isotactic polypropylene with lower crystallinity propylene/α-olefin copolymers which would span a broader range of hardness, for example, from Shore A of about 70 to more than 90, yet would not require a third blend component. However the polymerization catalysts used to make the copolymers of Fritz et al. application Ser. No. 281,942 were incapable of producing satisfactory copolymers for this purpose.

SUMMARY OF THE INVENTION

According to this invention there is provided a composition consisting essentially of a blend of an elastomeric copolymer of 45–90 mole percent of propylene and 10–55 mole percent of a $C_6$–$C_{12}$ α-olefin with an isotactic propylene polymer, the weight ratio of copolymer to isotactic propylene polymer being comprised within the range of about 5:95 to 95:5, wherein the following relationship exists:

$$x+y=a,$$

where $x$ = mole % of α-olefin in the copolymer and $x = 10$ to $55$;
$y$ = crystallinity number of the copolymer and $y = 10$ to $37$; and
$a = 20$ to $65$.

DETAILED DESCRIPTION OF THE INVENTION

Figure 1:
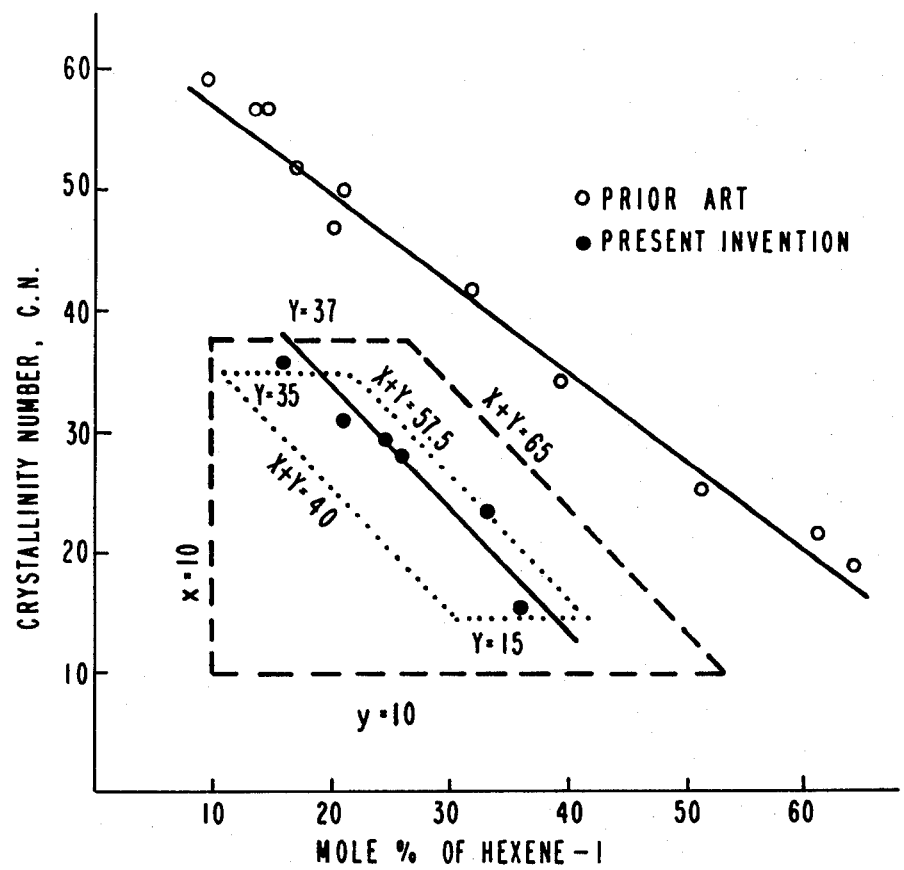
FIG. 1 is a graph illustrating the equation $x+y=a$, as defined above.

Suitable propylene/α-olefin copolymer can be conveniently prepared using the catalyst described in German Offenlegungschrift No. 2,757,863, of Mitsui Petrochemical Industries, Ltd, published June 29, 1978. The catalyst is titanium chloride, $TiCl_x$ ($x=3$ or $4$) supported on a magnesium compound, preferably magnesium chloride. Titanium chloride is reduced with a suitable cocatalyst, for example, a trialkylaluminum, to active catalyst species, which can be further modified by the addition of an organic electron donor. Typical electron donors are either oxygen-containing compounds such as esters, alcohols, phenols, ketones, aldehydes, carboxylic acids, acid amides, anhydrides, and ethers; or nitrogen-containing compounds such as amines, nitriles, and isocyanates. Mixtures of two or more electron donors can be used. The preferred reducing agent is triethylaluminum, and the preferred electron donor is an ester, for example, methyl p-toluate. The mole ratio of trialkylaluminum to electron donor to titanium halide preferably is about 100:33:1. The ratio is not critical so long as an excess of trialkylaluminum is always present. The amount of solid $TiCl_x$/magnesium compound combination is usually about 0.05–0.15 g per liter of polymerization mixture. This is equivalent to about 0.01–0.03 millimole of titanium chloride. Depending on residence time and viscosity, the productivity rate is from several hundred thousand to several million grams of copolymer per mole of $TiCl_x$. This catalyst has two very important characteristics: it has high stereospecificity and active site uniformity. Certain earlier titanium chloride catalysts give copolymers which are not suitable in the process of this invention; for example, when the monomer proportions are within the correct range, the crystallinity number is too high; or, when the crystallinity is within the correct range the α-olefin content is too high, and the physical properties of the copolymer are poor.

Polymerization can be carried out either in gas phase or in liquid phase. The latter is preferred. A hydrocarbon solvent, such as, for example, hexane, cyclohexane, or octane, is present. Once the monomers have been introduced into the polymerization reactor, the catalyst is added, and the polymerization is allowed to proceed at a temperature of about 0°–140° C., preferably 35°–70° C., at a pressure of about 0.1–5 MPa, preferably 0.1–2 MPa.

The preferred α-olefin is hexene-1 because its copolymers with propylene have by themselves good physical properties even at low crystallinity and can be significantly improved by blending with even a small amount of isotactic polypropylene. Other α-olefins which can be used to make copolymers suitable in the compositions of the present invention include heptene-1, octene-1, nonene-1, decene-1, undecene-1, and dodecene-1.

The crystallinity number of propylene/α-olefin copolymers is determined by infrared spectroscopy, according to the following equation:

$$C.N. = \frac{A_{10.03 \, \mu m}}{A_{10.30 \, \mu m}} \times 100,$$

where C.N. is crystallinity number, and A is optical absorbancy at the indicated wavelength. These absorbancies are preferably determined with a Perkin-Elmer, Model 221 prism instrument at a resolution of 960. Other instruments may give slightly different figures, depending on their resolution.

The preferred copolymers have a melt index of 0.01 to 100, as determined by ASTM 1238 at 230° C. and a load of 2160 g. In the preferred copolymer $x = 10-40$; $y = 15-35$; and $a = 45-57.5$. Within these limits, the copolymer has the best combination of crystallinity number and physical properties.

Depending on the proportion of propylene/α-olefin copolymer in a blend with isotactic propylene polymer, the properties of the blend will range from those of soft elastomers (less than 80 A Shore hardness) to those of rigid plastics (more than 60 D Shore hardness). The blend hardness, naturally, increases with the isotactic polypropylene content. Blends containing about 5–15 weight percent of propylene/hexene-1 copolymer are particularly useful in making spunbonded fiber materials. The presence of copolymer in those blends improves bonding strength between layers of the spunbonded material. Blends containing about 60–80 weight percent of propylene/hexene-1 copolymer can be readily injection molded into a variety of elastoplastic articles or oriented into high strength elastic straps. Other uses for the compositions of the present invention include, for example, thermoplastic elastomers, flexible plastics, film, and adhesives. Blends for use in adhesives should have a higher proportion of copolymer as well as a higher proportion of α-olefin in the copolymer. Such blends also must contain a tackifier, which may be any commercial tackifying resin.

Isotactic propylene polymer used in the blends of this invention normally will be isotactic polypropylene, which is a readily available article of commerce; but copolymers of propylene with small amounts of another ethylenically unsaturated monomer, especially an α-olefin, can also be used. Suitable isotactic propylene copolymers with small amounts of other monomers must have a sharp melting point above about 150° C.

FIG. 1 shows the relationships between the crystallinity number and the mole proportion of hexene-1 (an α-olefin within the scope of the present invention) for both the prior art copolymers, such as those described in the abandoned Fritz et al. patent applications and in the Shih patent, and those used in the blends of the present invention. The useful area according to the present invention is the right angle trapeze marked by the broken lines, while the preferred area is the parallelogram marked by the dotted lines. The continuous straight lines for both types of copolymers are based on actual data for a number of copolymers in each group. The five lowest experimental points along the straight line labelled "Prior Art" were obtained by the present inventor for polymers made with the Stauffer catalyst mentioned in the above-cited abandoned Fritz et al. applications.

Figure 2:
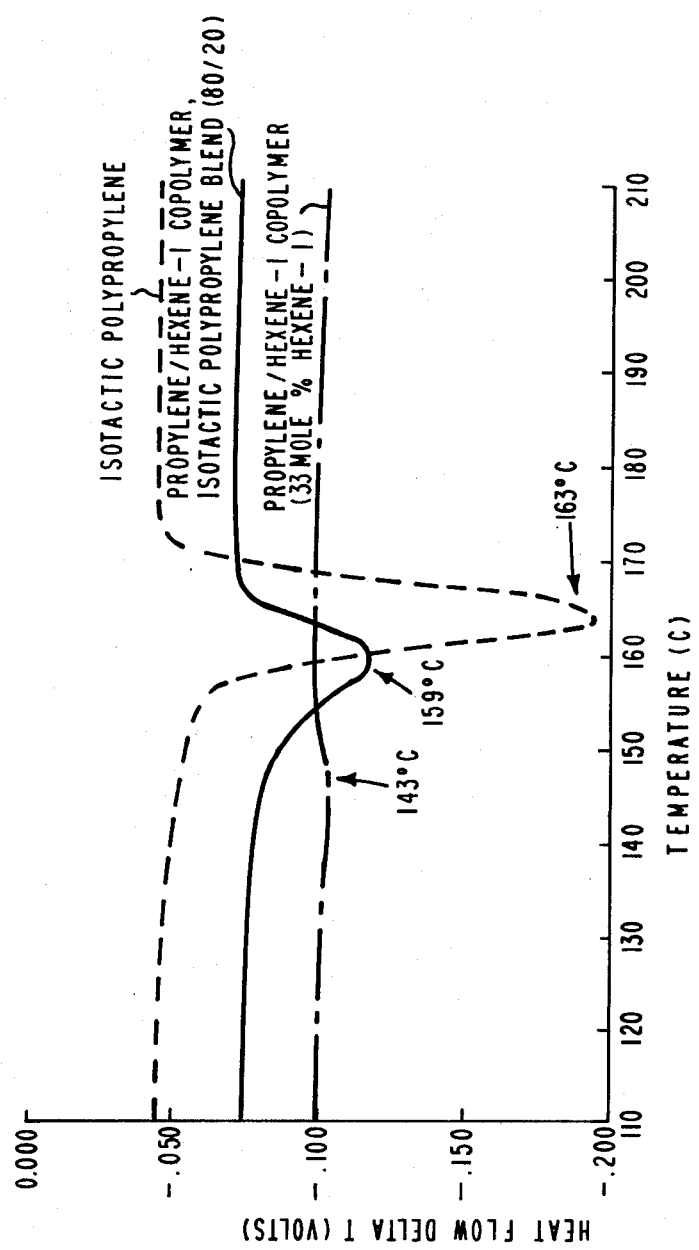
FIG. 2 is a plot of differential scanning calorimetry curves for three polymers.

FIG. 2, which shows three differential scanning calorimetry graphs, indicates that when isotactic polypropylene is blended with a propylene/hexene-1 copolymer according to the present invention, cocrystallization occurs because the blend has only one peak, which is shifted from the original 163° C. to 159° C. At the same time, the shoulder at 143° C., characteristic of the propylene/hexene-1 copolymer, disappears.

The compositions of the present invention are prepared by blending the components in suitable equipment in a manner which assures intimate admixture. Blending can be carried out in the melt, or in solution. Blending on a roll mill at an elevated temperature, above the melting temperatures of both polymers, is an acceptable technique.

This invention is now illustrated by the following representative examples of certain preferred embodiments thereof where all parts, proportions, and percentages are by weight unless otherwise indicated. All the catalyst preparation and polymerization work was carried out in an inert atmosphere. Data not originally obtained in SI units have been converted to SI units.

Catalyst Preparation

Anhydrous magnesium chloride was pulverized at about 0° C. in a stainless steel ball mill at high speed in the presence of a polysiloxane lubricant and of ethyl benzoate, which served as the electron donor. Best results were obtained when a combined vibrating and rotating roll mill was used. In order to reduce the particle size and increase the surface area of $MgCl_2$ to a satisfactory degree, it is necessary to run the ball milling operation for at least several hours but usually for several days.

Pulverized $MgCl_2$ was suspended in liquid titanium tetrachloride and stirred at 80° C. for several hours. The solid was filtered off, and unadsorbed $TiCl_4$ was removed by washing the solid with hexane. The $TiCl_4/MgCl_2$ adsorption complex, hereafter referred to as the solid catalyst, was found to contain 1–2.5% Ti and 55–60% Cl, depending on the particular batch.

The solid catalyst was activated in situ with triethylaluminum.

Copolymerization of propylene with hexene-1

EXAMPLE 1

A. Hexane, 1 liter, and 100 mL of hexene-1 were charged into a 2-liter resin kettle equipped with a stirrer an addition port for solids and liquids, gas inlet and outlet tubes, and a thermometer. The solution was saturated with gaseous propylene, which was passed through it for 30 minutes at atmospheric pressure and ambient temperature. The catalyst components were added in the following order and quantities: triethylaluminum, 10 millimoles; methyl p-toluate, 3.3 millimoles; and the solid catalyst, 0.3 g. The contents of the resin kettle were stirred for 90 minutes at about 25° C. Polymerization was stopped by the addition of a small amount of methanol and about 0.5 g of an antioxidant, which was a 2:5 mixture of a condensate of 3-methyl-6-t-butylphenol with crotonaldehyde ("Topanol" CA, ICI) and a bisphenol derivative sold by American Cyanamid Co. under the name "Cyanox" LDTP. The viscous polymerization mixture was poured into 2 L of methanol in a high speed blender. A white, partly rubbery, particulate polymer (65 g) was thus precipitated, washed with methanol, and isolated. It was found by infrared spectroscopy to contain 17 mole % of hexene comonomer.

B. When the above polymerization was repeated using 300 mL of hexene-1, 58 g of copolymer containing 25 mole % of hexene comonomer (by infrared spectroscopy) was recovered.

physical properties of each copolymer are given in Table I, below.

TABLE I

| Run | C | D | E | F | G | H |
|---|---|---|---|---|---|---|
| Hexane, mL | 1050 | 1000 | 950 | 900 | 850 | 800 |
| Hexene-1, mL | 150 | 200 | 250 | 300 | 350 | 400 |
| Polymer, g | 69 | 107 | 74 | 70 | 68 | 64 |
| mole % Hexene-1 (IR) | 16 | 21 | 24 | 26 | 33 | 36 |
| Crystallinity Number | 36 | 31 | 30 | 28 | 23 | 15 |
| Inherent Viscosity | 6.4 | 5.9 | 6.4 | 6.6 | 6.5 | 6.9 |
| Melt Index 230° C. 2160 g | | 0.12 | | 0.06 | | 0.10 |

| | Stress/strain data (ASTM D412) at 25° C. and 70° C. | | | | | | | | | | | |
|---|---|---|---|---|---|---|---|---|---|---|---|---|
| | 25° C. | 70° C. | 25° C. | 70° C. | 25° C. | 70° C. | 25° C. | 70° C. | 25° C. | 70° C. | 25° C. | 70° C. |
| Modulus, $M_{100}$, MPa | 5.17 | 1.52 | 3.45 | 0.89 | 3.1 | 0.7 | 2.76 | 0.62 | 1.72 | 0.48 | 1.72 | 0.41 |
| Modulus, $M_{300}$ MPa | 11.7 | 2.76 | 10 | 5.03 | 9.31 | 1.1 | 8.28 | 1.03 | 5.51 | 0.70 | 4.48 | 0.59 |
| Tension at break, MPa | 25.86 | 5.51 | 20.34 | 2.76 | 19.66 | 2.13 | 18.27 | 1.79 | 14.48 | 1.24 | 12.76 | 0.97 |
| Elongation at break, % | 560 | 460 | 480 | 480 | 485 | 480 | 495 | 470 | 480 | 485 | 500 | 480 |
| Permanent set at break, % | 200 | 118 | 105 | 43 | 67 | 44 | 80 | 44 | 73 | 59 | 43 | 70 |
| Compr. set, % 22 hr/70° C. | | | 68 | | | | 66 | | 78 | | 84 | |
| Hardness, Shore A | 82 | | 82 | | 78 | | 71 | | 62 | | 59 | |
| Glass trans. temp. Tg, °C. | −19 | | −20 | | −21 | | −26 | | −25 | | −27 | |

This example describes the general process by which propylene/α-olefin copolymers used in this invention can be made and, especially the correlations between the α-olefin concentration in the reactor and its content in the copolymer. However, crystallinity numbers of the products of runs A and B were not determined.

EXAMPLE 2

Copolymerization of propylene with hexene-1 was then repeated with the same amount of catalyst as before but keeping the total volume of hexane plus hexene-1 constant at 1200 mL. The polymerization temperature was 30° C. In this case, the solution was first saturated with propylene, which was passed for 30 minutes at the rate of 1.5 L/min; catalyst was then added, and addition of propylene continued at the same rate for additional 60 minutes until polymerization was stopped. Polymerization conditions and results as well as the

EXAMPLE 3

Blends of propylene/hexene-1 copolymer with isotactic polypropylene.

The propylene/hexene-1 copolymer of Example 2, run G was roll mill blended at 180° C. with "AMOCO" 4018 isotactic polypropylene and with a stabilizer, crystalline 4,4'-thiobis(6-t-butyl-m-cresol). These were runs I through K. Similarly, the copolymer of Example 2, run H was blended with the same polypropylene. This was run L. Samples were compression molded at 180° C. The compositions and their physical properties are given in Table II, below. It is interesting to note that the elastomeric properties such as compression set and permanent set of the propylene/hexene copolymer improved in each case as a result of blending with isotactic polypropylene.

TABLE II

| Run | I | J | K | L |
|---|---|---|---|---|
| Propylene/hexene-1 copolymer, parts | 95 | 90 | 80 | 90 |
| Isotactic polypropylene, parts | 5 | 10 | 20 | 10 |
| Stabilizer, part | 1 | 1 | 1 | 1 |

| | Stress-strain properties (ASTM D412) at 25° C. and 70° C. | | | | | | | |
|---|---|---|---|---|---|---|---|---|
| | 25° C. | 70° C. | 25° C. | 70° C. | 25° C. | 70° C. | 25° C. | 70° C. |
| Modulus, $M_{100}$, MPa | 2.59 | 0.55 | 3.28 | 0.90 | 4.48 | 1.59 | 1.96 | 0.83 |
| Modulus, $M_{300}$, MPa | 6.55 | 0.97 | 8.10 | 1.38 | 9.14 | 2.69 | 6.90 | 1.24 |
| Tens. Strength at break, MPa | 15.51 | 1.52 | 16.72 | 2.41 | 17.59 | 4.28 | 14.41 | 2.21 |
| Elongation at break, % | 490 | 505 | 5.00 | 490 | 500 | 455 | 480 | 500 |
| Permanent set at break, % | 38 | 45 | 58 | 55 | 90 | 58 | 55 | 53 |
| Compr. set, % 22 hr./70° C. | 62 | | 63 | | 54 | | 58 | |
| Hardness Shore A | 73 | | 78 | | 82 | | 74 | |

EXAMPLE 4

A series of copolymers of propylene and hexene-1 were prepared under the conditions shown in Table III, below, using the same equipment and technique as described in Example 1, except that conventional TiCl₃ (Stauffer AA) catalyst component was used. That catalyst is mentioned in abandoned patent application Ser. No. 369,273 of Fritz et al., which was a continuation-in-part of their abandoned application Ser. No. 281,942. The active catalyst was made by combining 2 mmoles of triethylaluminum and 1 mmole of TiCl₃. The experimental conditions and results are given below:

TABLE III

| Run | M | N | O | P |
|---|---|---|---|---|
| Hexane (mL) | 1000 | 1000 | 1000 | 1000 |
| Hexene-1 (mL) | 100 | 150 | 175 | 200 |
| g polymer | 56 | 56 | 47 | 60 |
| Time, min | 30 | 25 | 15 | 20 |
| mole % of hexene-1 | 49 | 52 | 61 | 64 |
| Crystallinity No. | 33 | 25 | 22 | 19 |

Physical properties and strain/stress data were obtained for the products of runs M, N, and O. The product of run P was too weak to be tested. Compression set (70° C., 22 hr) could not be determined for any of the M, N, and O products because of their practically total permanent deformation and flow under pressure at the test temperature.

| | M | | N | | O | |
|---|---|---|---|---|---|---|
| Run | 25° | 70° C. | 25° | 70° C. | 25° | 70° C. |
| $M_{100}$ (MPa) | 1.03 | — | 0.69 | Too Weak | 0.34 | Too weak |
| $M_{300}$ | 1.72 | — | 1.03 | Too Weak | 0.41 | Too weak |
| $T_B$ | 3.45 | <0.3 | 2.41 | Too Weak | 1.03 | Too weak |
| $E_B$ | 600 | >500 | 700 | Too Weak | 1000 | Too weak |
| Permanent set, % | 73 | — | 73 | Too Weak | >200 | Too weak |
| Shore A Hardness | 53 | | 53 | | 18 | |

The above data show that copolymers of propylene/hexene-1 made with that earlier commercial catalyst, which do not satisfy the conditions of the critical equation x+y= a set forth in the Summary of the Invention, have poor physical properties.

EXAMPLE 5

Propylene/hexene-1 copolymers of Example 4, runs M, N, and O were blended with "Amoco" 4018 isotactic polypropylene, and the blends' physical properties and stress/strain values were determined. The experimental conditions and results are given in Table IV, below.

TABLE IV

| Run | Q | R | S |
|---|---|---|---|
| Copolymer of Ex. 4, run N | 90 | — | — |
| Copolymer of Ex. 4, run O | — | 90 | — |
| Copolymer of Ex. 4, run P | — | — | 90 |
| Isotactic polypropylene | 10 | 10 | 10 |
| Stabilizer | 1 | 1 | 1 |

Physical Properties and Stress/Strain data.

| | Q | | R | | S | |
|---|---|---|---|---|---|---|
| Run | 25° | 70° C. | 25° | 70° C. | 25° | 70° C. |
| $M_{100}$ | 2.07 | 0.34 | 1.72 | 0.41 | 1.03 | Too weak |
| $M_{300}$ | 2.93 | 0.52 | 2.07 | 0.52 | 1.31 | Too weak |
| $T_B$ | 5.85 | 0.66 | 4.0 | 0.69 | 1.59 | Too weak |
| $E_B$ | 800 | 530 | 890 | 545 | 540 | Too weak |
| Permanent set, % | 150 | N.B.* | 200 | N.B.* | 155 | |
| Compression set, % (70° 22hr) | | 82 | | 83 | | 87 |
| Shore A Hardness | 65 | | 62 | | 53 | |

*N.B. = no break because of instrument limitations on the extent of elongation

By comparing these results with those of Table II, runs J and L, one notes the superior properties of those blends of Table II.

EXAMPLE 6

Injection molding of propylene/hexene-1 copolymer blend with isotactic polypropylene.

Several small samples of propylene/hexene-1 copolymer having slightly different hexene-1 contents were combined to give a material which had an average hexene-1 content of about 30-38 mole % (by IR). This material was blended at 180° C. with "AMOCO" 4018 isotactic polypropylene in a copolymer/polypropylene ratio of 80:20. The blend was separated into two portions; one was milled until a melt index of 1.2 (230° C.) was achieved, while the other portion was milled further until a melt index of 3.2 was achieved. The change in melt index is due to shear "cracking" of the copolymer. Milling permits reduction of the molecular weight to improve melt flow properties of the polymeric composition during injection molding. Each sample was injection molded in a ram type laboratory machine into 7.5×12.5×0.19 cm slabs under the following conditions: Barrell temperature=240° C., mold temperature=80° C., molding cycle=about 30 sec. Both molded samples were transparent and had smooth surfaces. Their physical properties at 25° C. and 70° C. are given in Table V.

TABLE V

| Sample | T | | U | |
|---|---|---|---|---|
| Melt Index | 1.2 | | 3.2 | |
| | 25° C. | 70° C. | 25° C. | 70° C. |
| Modulus, $M_{100}$, MPa | 8.97 | 1.66 | 8.62 | 1.93 |
| Modulus, $M_{300}$, MPa | 15.52 | 2.76 | 18.00 | 3.31 |
| Tensile Strength at break, MPa | 21.38 | 4.14 NB* | 34.48 | 5.86 NB* |
| Elon. at break, % | 490 | 420 NB* | 570 | 460 NB* |
| Permanent set at break, % | 95 | 94 NB* | 165 | 147 NB* |

*NB = no break because of instrument limitations on the extent of elongation.

EXAMPLE 7

Preparation of propylene/decene-1 copolymer.

Copolymerization of propylene with decene-1 was carried out according to the general technique of Example 1, except that the starting α-olefin solution in hexane consisted of 500 mL of decene-1 and 700 mL of hexane. About 68 g of copolymer was recovered. Its decene-1 comonomer content was 22 mole % (by $^{13}$C NMR). It had a crystallinity number of 37. Its physical properties at 25° C. and 70° C. were as follows:

TABLE VI

| | 25° C. | 70° C. |
|---|---|---|
| Modulus, $M_{100}$, MPa | 1.52 | 0.41 |
| Modulus, $M_{300}$, MPa | 3.31 | 0.76 |
| Tensile Strength at break, MPa | 6.62 | 1.17 |
| Elongation at break, % | 480 | 450 |
| Permanent set, % | 32 | 61 |
| Compression set, % | — | 80 |
| Shore A Hardness | | 49 |

EXAMPLE 8

Blend of propylene/decene-1 copolymer with isotactic polypropylene.

A blend was prepared on a roll mill at 180° C. from 80 parts of the copolymer of Example 7 and 20 parts of "AMOCO" 4018 isotactic polypropylene. A compression molded test sample was made, and its physical properties were observed as follows:

TABLE VII

| | 25° C. | 70° C. |
|---|---|---|
| Modulus, $M_{100}$, MPa | 5.52 | 2.62 |
| Modulus, $M_{300}$, MPa | 8.62 | 4.14 |
| Tensile Strength at break, MPa | 12.60 | 4.83 |
| Elongation at break, % | 480 | 380 |
| Permanent set, % | 62 | — |
| Compression set at Break, % | — | 62 |
| Shore A Hardness | 75 | |

By comparing the data in Table VII with those in Table VI, it can be seen that the physical properties of the above propylene/1-decene copolymer are significantly improved by blending with isotactic polypropylene without appreciably changing the elastomeric properties of the composition. The compression set at 70° C. also is improved.

EXAMPLE 9

Orientation of a blend of propylene/hexene-1 copolymer with isotactic polypropylene.

Two blends of propylene/hexene-1 copolymer with isotactic polypropylene were prepared. Samples were injection molded and oriented at 23° C. by stretching in one direction to obtain a 550% elongation. The physical properties of these blends were compared with those of a similarly stretched sample of an experimental, higher cost, copolyetherester. The results are given below in Table VIII:

TABLE VIII

| Sample | V | W | X (copolyetherester) |
|---|---|---|---|
| Composition, % | | | |
| copolymer | 80 | 60 | — |
| isotactic polypropylene | 20 | 40 | — |
| Orientation set | 2.9 × | 3.9 × | 4.0 × |
| Modulus, $M_{200}$, MPa | 18 | 35 | 30 |
| Tensile Strength at break, MPa | 50 | 95 | 150 |
| Elon. at break, % | 130 | 80 | 100 |

It can be seen that the properties of the blends of the present invention, while not comparable in all respects with those of the copolyetherester, are very good for practical applications.

I claim:

1. A composition consisting essentially of a blend of an elastomeric copolymer of 45–90 mole percent of propylene and 10–55 mole percent of a $C_6$–$C_{12}$ α-olefin with isotactic polypropylene, the weight ratio of copolymer to isotactic propylene polymer being comprised within the range of about 5:95 to 95:5, wherein following relationships exist:

$$x+y=a,$$

where x = mole % of α-olefin in the copolymer, and x = 10 to 55;
  y = crystallinity number of the copolymer determined by infrared spectroscopy, and y = 10 to 37; and
  a = 20 to 65.

2. A composition of claim 1 wherein x = 10 to 40; y = 15 to 35; and a = 45 to 57.5.

3. A composition of claim 1 wherein the amount of the copolymer in the blend is about 5–15 weight percent.

4. A composition of claim 1 wherein the amount of the copolymer in the blend is about 60–80 weight percent.

5. A composition of claim 1 wherein the α-olefin is hexene-1 or decene-1.

6. A composition of claim 1 wherein the isotactic propylene polymer is homopolypropylene.

7. A composition of claim 1 wherein the isotactic propylene polymer is a copolymer of propylene with a minor amount of another ethylenically unsaturated monomer, such copolymer having a sharp melting point above about 150° C.

8. A composition of claim 7 wherein the unsaturated comonomer is an α-olefin.

* * * * *

REEXAMINATION CERTIFICATE (684th)
United States Patent [19]
Su

[11] B1 4,461,872

[45] Certificate Issued May 19, 1987

[54] BLENDS OF A PROPYLENE/α-OLEFIN COPOLYMER WITH ISOTACTIC PROLYPROPYLENE

[75] Inventor: Aaron C. L. Su, Wilmington, Del.

[73] Assignee: E. I. Du Pont de Nemours and Company, Wilmington, Del.

Reexamination Request:
No. 90/000,989, Apr. 21, 1986

Reexamination Certificate for:
Patent No.: 4,461,872
Issued: Jul. 24, 1984
Appl. No.: 468,409
Filed: Feb. 22, 1983

[51] Int. Cl.$^4$ .............. C08L 23/10; C08L 23/18
[52] U.S. Cl. ................. 525/240; 526/348.3; 526/348.5
[58] Field of Search ........................ 525/240

[56] References Cited
U.S. PATENT DOCUMENTS
4,211,852  7/1980  Matsuda et al. ............ 525/240

FOREIGN PATENT DOCUMENTS
53-104686  9/1976  Japan .

Primary Examiner—Wilbert J. Briggs

[57] ABSTRACT

Blends of an isotactic propylene polymer with a copolymer of propylene with a $C_6$–$C_{12}$ α-olefin, wherein the mole proportion of the α-olefin in the copolymer is 10–55%; the crystallinity number of the copolymer is 10 to 37; and the sum of the mole proportion of α-olefin in the copolymer and the copolymer's crystallinity number is 20–65 are useful in a variety of applications requiring a broad range of properties from soft elastomers to rigid plastics, including spunbonded fiber materials, film, and adhesives.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *